United States Patent [19]

Bourgois et al.

[11] Patent Number: 5,198,307
[45] Date of Patent: Mar. 30, 1993

[54] STEEL STRIP AND METHOD OF MAKING

[75] Inventors: Luc Bourgois, Desselgem; Urbain D'Haene, Ingooigem; Daniël Van Wassenhove, Merelbeke, all of Belgium

[73] Assignee: N. V. Bekaert S.A., Zwevegem, Belgium

[21] Appl. No.: 794,896

[22] Filed: Nov. 20, 1991

[30] Foreign Application Priority Data

Dec. 21, 1990 [EP] European Pat. Off. ........ 90203483.4

[51] Int. Cl.[5] ....................... B60C 9/16; B65G 15/36; B21F 17/00; D07B 1/00
[52] U.S. Cl. ..................................... 428/589; 428/592; 152/527; 57/6; 57/9; 57/212; 57/902
[58] Field of Search ............... 428/589, 592, 624, 625, 428/626; 152/451, 527, 556; 57/212, 213, 217, 232, 902, 6, 9

[56] References Cited

U.S. PATENT DOCUMENTS

| | | | |
|---|---|---|---|
| 3,449,199 | 6/1969 | Mead | 161/47 |
| 3,482,818 | 12/1969 | Neale, Sr. | 254/134.3 |
| 4,243,714 | 1/1981 | Vanassche et al. | 428/258 |
| 4,544,603 | 10/1985 | Richards | 57/902 |
| 4,545,190 | 10/1985 | Rye et al. | 57/9 |
| 4,566,261 | 1/1986 | Brandyberry et al. | 57/9 |
| 4,650,531 | 3/1987 | Brandyberry et al. | 57/902 |
| 4,718,224 | 1/1988 | Obata | 57/212 |
| 4,802,326 | 2/1989 | Senyagin et al. | 57/9 |
| 4,840,214 | 6/1989 | Bourgois | 152/527 |

FOREIGN PATENT DOCUMENTS

| | | |
|---|---|---|
| 0264981 | 4/1988 | European Pat. Off. . |
| 2301290 | 8/1973 | Fed. Rep. of Germany . |
| 21428 | of 1906 | United Kingdom ................. 152/556 |

Primary Examiner—John Zimmerman
Attorney, Agent, or Firm—Foley & Lardner

[57] ABSTRACT

A steel strip (1) comprises two to seven round steel filaments (2) lying in parallel adjacent to one another so as to form a single plane of core filaments and one or more filaments (4) which are wrapped around the core filaments in one single wrapping direction. One or more core filaments, individually, or the plane of the core filaments as a whole have residual elastic torsions to such an extent that the strip remains substantially flat over the whole length of the strip if the strip is not subjected to external forces.

10 Claims, 2 Drawing Sheets

STEEL STRIP AND METHOD OF MAKING

BACKGROUND OF INVENTION

1. Field of the Invention

The present invention relates to a steel strip wherein the steel strip comprises two to seven round steel filaments lying in parallel adjacent to one another so as to form a single plane of core filaments and one or more filaments which are wrapped around the core filaments in one single wrapping direction.

2. Description of the Related Art

Such steel strips may be used for the reinforcement of elastomers or rubber products, e.g. rubber tires. Particularly, such steel strips may be used for the reinforcement of plies in a radial tire, whereby the term plies refers to carcass plies or to breaker plies. The elongated cross-section of such steel strips is highly appreciated in the plies of a radial tire: the steel strip has a higher bending stiffness in the plane of the strip than in a plane comprising the longitudinal axis of the strip and being perpendicular to the plane of the strip. The high bending stiffness in the plane of the strip reduces the deformation and heat generation under alternating stresses in that plane whereas a good flexibility is maintained in any plane perpendicular to the plane of the strip. Moreover, such a steel strip provides the amount of steel required without decreasing the fatigue resistance or without increasing the ply thickness, on the contrary.

In case such a steel strip is used for the reinforcement of plies in a rubber tire, the diameter of the core filaments ranges from 0.10 mm to 0.40 mm, and preferably from 0.15 mm to 0.35 mm. The core filaments preferably have a tensile strength above $$2325 - 1130 \log d \text{ Newton/mm}^2$$

whereby d is the filament diameter expressed in mm. The composition of the steel filaments has a carbon content which ranges from 0.60 to 0.95%, preferably from 0.75 to 0.85%, a manganese content between 0.40 and 0.70%, a silicon content between 0.15 and 0.50% and a maximum sulphur content and phosphorus content of 0.03%, all percentages being percentages by weight. The composition may also comprise—either alone or in combination —other alloying elements such as chromium, molybdenum, vanadium, nickel, boron (either free or bound), niobium . . . The core filaments are conveniently covered with a rubber adherable coating such as brass or a brass alloy. The filament which is wrapped around the core filaments usually has a diameter which is smaller than the diameter of the core filaments. This filament is not necessarily a round filament, it may have a flattened cross-section. This filament is not necessarily a steel filament with the same composition as mentioned hereabove, but may be any filament which unifies the core filaments and gives the steel strip the necessary compression resistance.

When the steel strip is used for the reinforcement of plies in a radial tire, it must not have any flare, it must be straight and must be flat over the whole length of the strip. The steel strip must not have any wildness so that calendering and cutting does not form any problems.

Due to the asymmetrical action of the wrapping filament(s) which is (are) wrapped around the core filaments, however, the requirements of flatness and absence of wildness and flare over the complete length of the strip have not been met by existing steel strips.

SUMMARY OF THE INVENTION

It is an object of the present invention to avoid the drawbacks of existing steel strips and to provide a steel strip which gives no difficulties to handle during the production of calendered inserts for radial tires or other rubber articles.

According to a first aspect of the present invention, there is provided a steel strip which comprises two to seven round steel filaments lying in parallel adjacent to one another and in contact with one another so as to form a single plane of core filaments. One or more filaments are wrapped around the core filaments in one single wrapping direction. One or more core filaments, individually, or the plane of the core filaments as a whole, have residual elastic torsions to such an extent that the strip remains substantially flat over the whole length of the strip if the strip is not subjected to external forces.

One or more core filaments, individually, or the plane of the core filaments as a whole have residual elastic torsions if one end of a specified length of the core filament(s), when freed from any constraints such as the wrapping filaments, shows a number of revolutions in one or another sense. The amount and the sense of the residual torsions must be such that an equilibrium is reached between the moment exercised by the wrapping filament(s) and the moment exercised by the residual torsions in the core filaments.

The equilibrium may be reached when all the core filaments have residual elastic torsions or when, e.g. only the extremely right and the extremely left core filaments have residual elastic torsions or when, e.g. only one core filament has residual elastic torsions.

In a particular embodiment of the invention two or more filaments are wrapped around the core filaments and these filaments nowhere cross each other.

The advantage of this particular embodiment is that this embodiment can be manufactured more economically than a steel strip with only one wrapping filament. This can be explained by the fact that the wrapping operation is a rather slow operation and that output can be increased by simultaneously wrapping with two or more wrapping filaments. Crossing of two wrapping filaments, however, has to be avoided, since this would lead to a diameter in radial direction which is too thick.

According to a second aspect of the present invention, there is provided a process for manufacturing a steel strip wherein the steel strip comprises two to seven round steel filaments lying in parallel adjacent to one another and in contact with one another so as to form a single plane or core filaments and one or more filaments which are wrapped around the core filaments in one single wrapping direction. The process comprises at least following steps:

wrapping the core filaments with the one or more filaments;

rolling the wrapped core filaments.

The process is characterized in that it further comprises a step where one or more core filaments, individually, or the plane of the core filaments as a whole are subjected to torsions around their longitudinal axes to such extent that the resulting steel strip remains substantially flat over the whole length of the strip if the strip is not subjected to external forces.

Subjecting one or more core filaments individually to torsions can be done in any suitable way:

by winding the filaments with torsion after the last wet drawing step and unwinding the filaments without torsion;

by unwinding the filaments with a single torsion or with a double torsion before the wrapping and rolling step;

by subjecting the filaments to a false twist operation beyond the elastic limit after the last wet drawing step before winding up or after the unwinding but before the wrapping step; as is generally known in the art, false twisting the filaments beyond the elastic limit may result in filaments having residual torsions.

All the core filaments may be subjected to a torsion but it is also possible that only the extremely right and extremely left core filaments are subjected to a torsion or that only one core filament is subjected to a torsion.

Subjecting a steel filament to a torsion, however, is liable to saturation: once the saturation level or elasticity limit has been reached, a steel filament has the same residual torsions independent from the imposed torsions. As a consequence, if only one or some core filaments have been subjected to a torsion, it is possible that their action is not sufficient to keep the plane of the strip substantially flat over the length of the strip.

BRIEF DESCRIPTION OF THE DRAWINGS

The invention will now be further explained with reference to the accompanying drawings wherein.

DETAILED DESCRIPTION OF THE PREFERRED EMBODIMENTS

Figure 1:
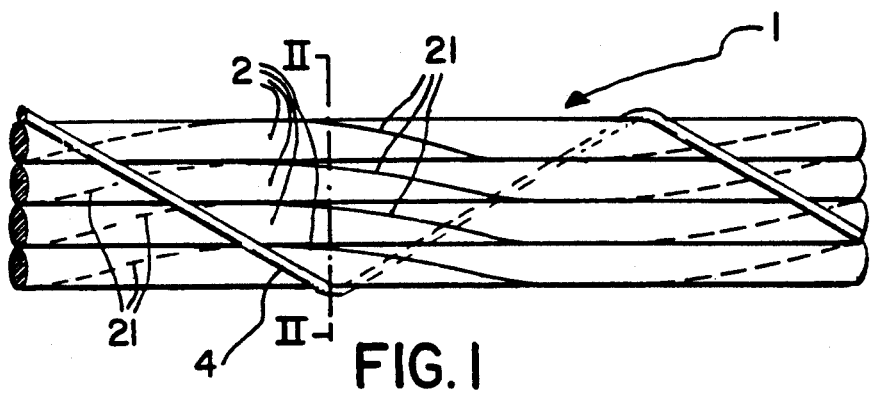
FIG. 1 shows an elongated view of a steel strip according to the invention.

In the case of FIG. 1 four elongated round steel filaments 2 ly in parallel adjacent to one another and form a common plane of core filaments. A metal filament 4 is wrapped around the core filaments 2 in S-direction and forms together with the core filaments 2 a steel strip 1. The diameter of the core filaments 2 is 0.30 mm. The diameter of the wrapping filament 4 is 0.15 mm. The wrapping lay is the axial distance needed for one revolution of the wrapping filament 4 and is 3.5 mm. Conveniently the wrapping lay of a single wrapping filament ranges from 2 mm to 7 mm. The core filaments 2 have been subjected to torsions in the S-direction. This is shown by the lines 21. The torsions on the core filaments can sometimes be discovered on the final product if there are drawing lines present on the core filaments. Drawing lines are small grooves which have been caused by irregularities of the drawing dies. If the core filaments have been subjected to torsions, these drawing lines have a helicoidal form. Anyway, even if no drawing lines are present, core filaments which have residual elastic torsions show a number of revolutions when they are freed from any constraints.

Figure 2:
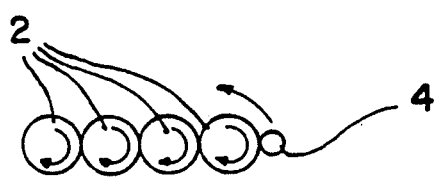
FIG. 2 shows a cross-section of a steel strip according to plane II—II of FIG. 1.

Referring to FIG. 2, the torsions of the core filaments 2 result in moments in the sense of the arrows and these moments make an equilibrium with the moment exercised by the wrapping filament 4. If all the core filaments have been subjected to torsions, one and a half to four torsions (1.5–4) per meter for each of the core filaments suffice to compensate for the asymmetrical effect of the wrapping filament with a wrapping lay of 3.5 mm. The exact number to torsions depends on the friction of the core filaments with one another.

Figure 3:
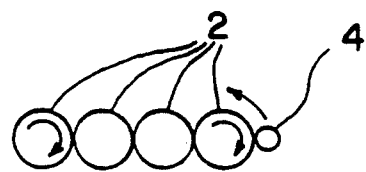
FIG. 3 shows a cross-section of another embodiment of a steel strip according to the invention.

As an alternative embodiment, the moment exercised by the wrapping filament 4 may also be balanced by the moments of the extremely right and extremely left core filaments, while the central core filaments do not have residual torsions. This is illustrated on FIG. 3.

Figure 4:
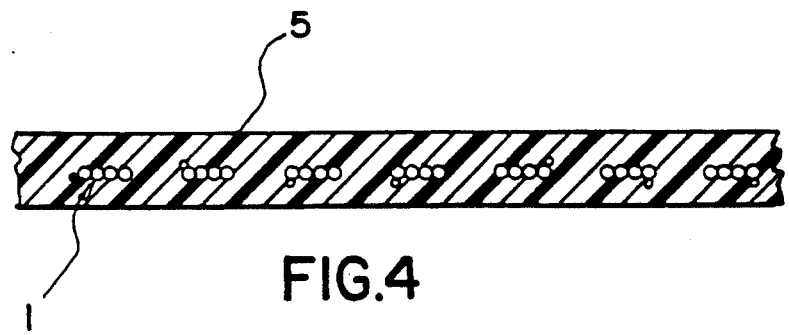
FIG. 4 shows a cross-section of a rubber ply reinforced with a steel strip.

FIG. 4 illustrates a rubber ply 5 of a radial tire which is reinforced with steel strips 1. If the steel strips 1 remain flat and have no wildness over their whole length then the manufacturing of such rubber plies can be done without difficulties and without increasing unnecessarily the thickness of the rubber ply 5.

A stable and flat rubber ply 5 can also be manufactured by lying a steel strip 1 which is wrapped in S-direction next to a steel strip 1 which is wrapped in Z-direction. However, if no measures are taken to increase the stability and flatness of the steel strip 1 itself, the handling and calendering of the steel strip may present serious problems. Moreover, manufacturing both a steel strip wrapped in S-direction and a steel strip wrapped in Z-direction is expensive.

Figure 5A:
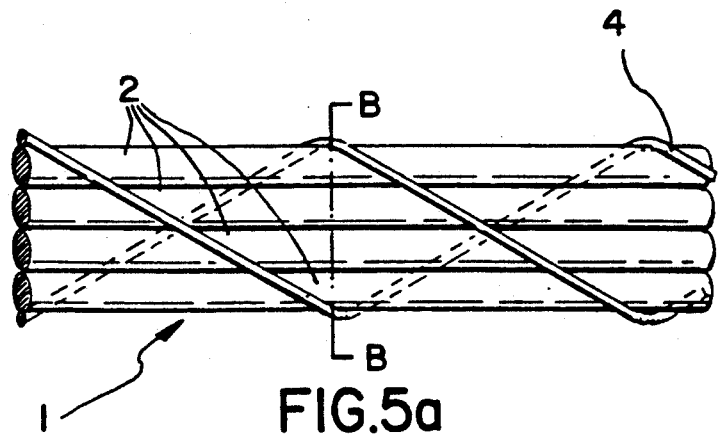
FIG. 5(a) illustrates another embodiment of a steel strip according to the invention.
Figure 5B:
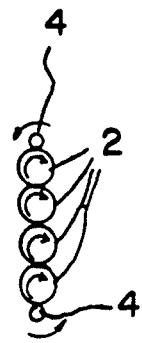
FIG. 5(b) is a sectional view of the embodiment of FIG. 5(a) as viewed along line B—B of FIG. 5(a)

FIG. 5 illustrates an embodiment where the plane of core filaments 2 is wrapped by two metal filaments 4. The wrapping is done in the same direction (S) and with the same lay so that no crossings of the wrapping filaments 4 occur. In the case of more than one wrapping filament the wrapping lay may be increased, which results in an increased output of the wrapping operation.

Figure 6:
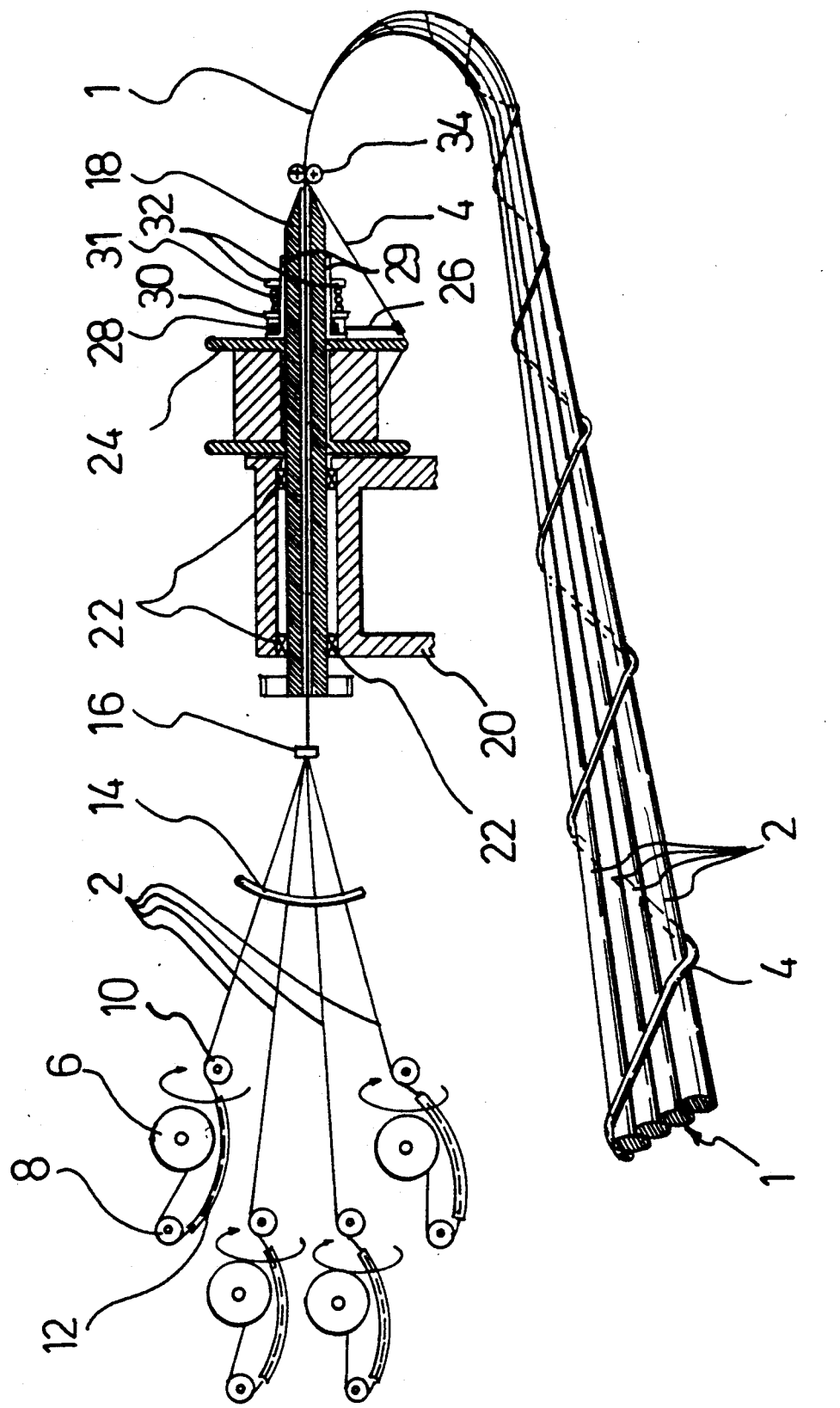
FIG. 6 illustrates process steps for manufacturing a steel strip according to the present invention.

FIG. 6 illustrates the manufacturing process of a steel strip according to the present invention. The core filaments 2 are withdrawn from their bobbins 6 and pass each individually over a reversing pulley 8, a rotating flyer 12 and a guiding pulley 10. The core filaments 2 are given two torsions around their axes for each rotation of the flyer 12.

The core filaments 2 pass through guiding means 14 and come together at an assembling point 16 before going through a wrapping machine. The wrapping machine comprises a rotatable hollow axle 18 which is mounted on a fixed frame 20 by means of bearings 22. The core filaments pass through the hollow axle 18 from left to right. At the right side the axle 18 tapers into a point where the core filaments 2 emerge. The wrapping machine further comprises a bobbin 24 mounted on the axle 18 for rotation together with the axle. The bobbin 24 comprises the wrapping filament 4, which is drawn over the flange of the bobbin by means of a flyer arm 26. The flyer arm 26 is rotatably mounted by means of a bearing 28 on a bush 29 which is removably fixed on the axle 18 and rotates together with the axle. The flyer arm can rotate with respect to the bobbin 24. This rotation is braked by means of a brake 30 which is laterally pressed to the left against the flyer 26 by means of a spring 31 the pressure of which is adjustable by means of a nut 32. The nut 32 engages with a screw-thread on the bush 29. In this way an adjustable tension is created in the wrapping filament 4.

At the point where the wrapping filament 4 joins the core filaments 2, these core filaments with the joining wrapping filament pass between two pressure rollers 32. During the rolling step the wrapping filament 4 may be plastically deformed. The rollers 32 should be positioned immediately after the joining point in order to have a tight wrapping and in order to avoid the core filaments from changing their position outside their plane.

We claim:

1. A steel strip (1) comprising
   two to seven round steel filaments (2) lying in parallel adjacent to one another and in contact with one another so as to form a single plane of core filaments and one or more filaments (4) which are wrapped around the core filaments in one single wrapping direction wherein
   one or more core filaments, individually, or the plane of the core filaments as a whole, have residual elastic torsions to such an extent that the strip remains substantially flat over the whole length of the strip if the strip is not subjected to external forces.

2. A strip according to claim 1 wherein all the core filaments individually have residual elastic torsions.

3. A strip according to claim 1 wherein only the extremely right and extremely left core filaments have residual elastic torsions.

4. A strip according to claim 1 wherein only one core filament has residual elastic torsions.

5. A strip according to claim 1 wherein there are two or more filaments (4) wrapped around the core filaments (2) and wherein these wrapping filaments (4) nowhere cross each other.

6. A process for manufacturing a steel strip (1)
   wherein the steel strip comprises
      two to seven round steel filaments (2) lying in parallel adjacent to one another and in contact with one another so as to form a single plane or core filaments and one or more wrapping filaments (4) which are wrapped around the core filaments in one single wrapping direction,
   the process comprising at least following steps:
      wrapping the core filaments (2) with the one or more wrapping filaments (4);
      rolling the wrapped core filaments;
   the process further comprising
      a step where one or more core filaments (2), individually, or the plane of the core filaments (2) as a whole are subjected to torsions around their longitudinal axes to such extent that the resulting steel strip (1) remains substantially flat over the whole length of the strip if the strip is not subjected to external forces.

7. A process according to claim 6
   wherein all the core filaments (2) are subjected to torsions around their longitudinal axes.

8. A process according to claim 6
   wherein only the extremely right and extremely left core filaments (2) have been subjected to torsions around their longitudinal axes.

9. A process according to claim 6
   wherein only one core filament has been subjected to torsions around its longitudinal axis.

10. A process according to claim 6
    wherein the core filaments (2) are subjected to torsions around their longitudinal axes by unwinding them by means of a double twister (8, 10, 12).

* * * * *